United States Patent
Girard

(10) Patent No.: US 10,458,544 B2
(45) Date of Patent: Oct. 29, 2019

(54) HYDRAULIC SLIP CONTROL METHOD AND ARRANGEMENT FOR A DRIVELINE INCLUDING A CONTINUOUSLY VARIABLE TRANSMISSION

(71) Applicant: TRANSMISSION CVTCORP INC., Sainte-Julie (CA)

(72) Inventor: Daniel Girard, Beloeil (CA)

(73) Assignee: TRANSMISSION CVTCORP INC., Sainte-Julie (CA)

( * ) Notice: Subject to any disclaimer, the term of this patent is extended or adjusted under 35 U.S.C. 154(b) by 341 days.

(21) Appl. No.: 15/327,703

(22) PCT Filed: Jul. 27, 2015

(86) PCT No.: PCT/CA2015/050708
§ 371 (c)(1),
(2) Date: Jan. 20, 2017

(87) PCT Pub. No.: WO2016/015149
PCT Pub. Date: Feb. 4, 2016

(65) Prior Publication Data
US 2017/0198812 A1 Jul. 13, 2017

Related U.S. Application Data

(60) Provisional application No. 62/030,645, filed on Jul. 30, 2014.

(51) Int. Cl.
*F16H 61/66* (2006.01)
*B60K 23/00* (2006.01)
(Continued)

(52) U.S. Cl.
CPC ............. *F16H 61/66* (2013.01); *B60K 23/00* (2013.01); *F16H 3/722* (2013.01); *F16H 35/10* (2013.01);
(Continued)

(58) Field of Classification Search
None
See application file for complete search history.

(56) References Cited

U.S. PATENT DOCUMENTS

| | | | |
|---|---|---|---|
| 2,377,199 A | 5/1945 | Adams et al. | |
| 4,078,452 A | 3/1978 | Rössler | |

(Continued)

FOREIGN PATENT DOCUMENTS

| | | |
|---|---|---|
| CN | 101462540 A | 6/2009 |
| CN | 101 809 335 A | 8/2010 |

(Continued)

OTHER PUBLICATIONS

English Translation of Chinese Patent Application No. 201580041129.X.

(Continued)

*Primary Examiner* — Justin Holmes
(74) *Attorney, Agent, or Firm* — K&L Gates LLP

(57) ABSTRACT

A slip control method and arrangement for a driveline including a continuously variable transmission is described herein. The driveline includes a hydraulic slip arrangement that is so controlled as to slip when a torque higher than the usable torque attempts to pass through. Accordingly, the hydraulic slip arrangement prevents the prime mover from stalling.

16 Claims, 3 Drawing Sheets

(51) Int. Cl.
  *F16H 59/36* (2006.01)
  *F16H 61/40* (2010.01)
  *F16H 61/4017* (2010.01)
  *F16H 3/72* (2006.01)
  *F16H 35/10* (2006.01)
  *F16H 61/662* (2006.01)
  *F16H 59/14* (2006.01)

(52) U.S. Cl.
  CPC .............. *F16H 59/36* (2013.01); *F16H 61/40* (2013.01); *F16H 61/4017* (2013.01); *F16H 61/66272* (2013.01); *F16H 2059/147* (2013.01); *F16H 2059/366* (2013.01); *F16H 2061/6604* (2013.01)

(56) References Cited

U.S. PATENT DOCUMENTS

| | | |
|---|---|---|
| 4,601,218 A | 7/1986 | Bohle |
| 4,665,773 A | 5/1987 | Hiramatsu et al. |
| 4,729,261 A | 3/1988 | Tervola |
| 5,010,989 A | 4/1991 | Huntley |
| 5,064,036 A | 11/1991 | Schneider |
| 5,206,805 A | 4/1993 | Petzold et al. |
| 6,412,617 B1 | 7/2002 | Spijker et al. |
| 6,565,482 B2 | 5/2003 | Kobayashi et al. |
| 6,719,656 B2 | 4/2004 | Bowen |
| 7,972,240 B2 | 7/2011 | Janasek |
| 8,092,339 B2 | 1/2012 | Heap et al. |
| 2007/0184936 A1* | 8/2007 | Nakayama ........ F16H 61/66272 477/44 |
| 2007/0197323 A1* | 8/2007 | Shimazu .......... F16H 61/66272 474/28 |
| 2009/0118082 A1 | 5/2009 | Heap et al. |
| 2009/0124455 A1 | 5/2009 | Brandsma et al. |
| 2011/0087394 A1 | 4/2011 | Shimanaka |
| 2012/0322613 A1 | 12/2012 | Suzuki et al. |
| 2014/0121911 A1 | 5/2014 | Davis et al. |

FOREIGN PATENT DOCUMENTS

| | | |
|---|---|---|
| CN | 103 477 105 A | 12/2013 |
| DE | 19903554 A1 | 8/2000 |
| EP | 0123738 A2 | 11/1984 |
| EP | 0 466 497 B1 | 9/1991 |
| EP | 2 127 984 A1 | 12/2009 |
| WO | 2015/106350 A1 | 7/2015 |

OTHER PUBLICATIONS

PCT International Search Report for International Patent Application No. PCT/CA2015/050017, dated Mar. 18, 2015, 3 pages.
International Search Report for International Application No. PCT/CA2015/050708, dated Oct. 27, 2015, 3 pages.
Written Opinion of the International Searching Authority for International Application No. PCT/CA2015/050708, dated Oct. 27, 2015, 5 pages.
Supplementary European Search Report for EP Application No. EP 15 82 7803, dated Apr. 10, 2018, 6 pages.

* cited by examiner

HYDRAULIC SLIP CONTROL METHOD AND ARRANGEMENT FOR A DRIVELINE INCLUDING A CONTINUOUSLY VARIABLE TRANSMISSION

CROSS REFERENCE TO RELATED APPLICATIONS

This is the national phase under 35 U.S.C. § 371 of International Application No. PCT/CA2015/050708, filed on Jul. 27, 2015, which claims priority to and the benefit of U.S. Patent Application No. 62/030,645, filed on Jul. 30, 2014, the entire disclosures of each of which are incorporated by reference herein.

FIELD

The present disclosure generally relates to drivelines including a continuously variable transmission (CVT). More specifically, the present disclosure is concerned with a hydraulic slip control method and arrangement for such a driveline.

BACKGROUND

CVTs are very interesting in all kinds of vehicles for their ability to continuously vary the speed ratio between the output of a prime mover and the wheels or other rotating parts of a vehicle.

However, some vehicular applications conventionally require a so-called torque converter between the prime mover and the wheels to a) prevent the prime mover from stalling when the wheels are prevented from rotating and b) increase the torque when the torque converter is slipping. These applications are generally not ideal candidates for continually variable transmissions since the advantages of the CVT are mitigated from the use of a torque converter.

There is therefore a need to provide a method and arrangement preventing the prime mover from stalling and multiplying the torque when the wheels are partially or totally prevented from rotating.

DETAILED DESCRIPTION

Figure 1:
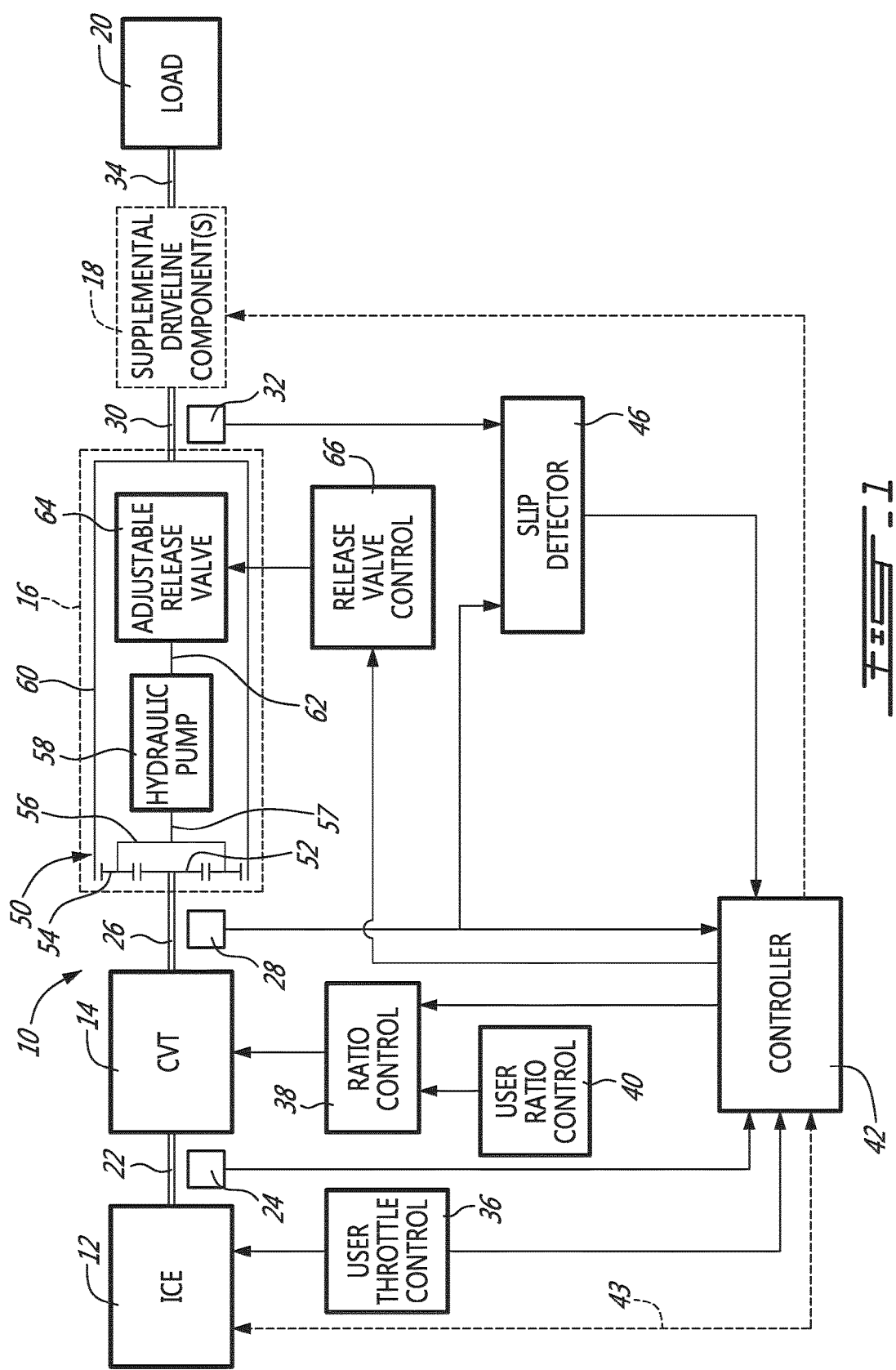
FIG. 1 is a block diagram of a driveline including a CVT and a slip control arrangement according to an illustrative embodiment.

An object is generally to provide an improved driveline including a CVT. More specifically, an object is to provide a hydraulic slip control method and arrangement used in a driveline including a CVT to prevent the prime mover from stalling.

According to an illustrative embodiment, there is provided a method to control the slippage of a driveline including a prime mover having an output, a continuously variable transmission (CVT) having an input connected to the output of the prime mover and an output, a controllable slippage level hydraulic slip arrangement having an input connected to the output of the CVT and an output, the method including the steps of determining a usable torque of the prime mover; and controlling the slippage level of the hydraulic slip arrangement to allow the usable torque to pass through the hydraulic slip arrangement but to slip should a requested torque be greater than the usable torque.

According to another aspect, there is provided a driveline including a prime mover having an output shaft, means for determining the speed of the output shaft, a CVT having an input connected with the output shaft of the prime mover and an output, a controllable hydraulic slip arrangement having an input connected with the output of the CVT and an output, a controller controlling the level of torque allowed to pass through the hydraulic slip arrangement before slippage occurs therein, a main controller connected with the output shaft speed determining means and the controller, the main controller being so configured as to determine a usable portion of the available torque of the prime mover and to set the controller so that the hydraulic slip arrangement slips when torques higher than the usable torque attempt to pass through the hydraulic slip arrangement.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine (ICE), a turbine engine, or any other mechanical power production element or assembly.

It is to be noted that the expression "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT and a cone CVT.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

It is to be noted that the expression "off-highway vehicle" is to be construed herein and in the appended claims as any type of vehicle that is designed specifically for use off-road, including, amongst others, construction vehicles and agricultural vehicles.

Other objects, advantages and features of the hydraulic slip control method and arrangement for a driveline including a continuously variable transmission will become more apparent upon reading of the following non-restrictive description of illustrative embodiments thereof, given by way of example only with reference to the accompanying drawings.

FIG. 1 of the appended drawings illustrate a driveline 10 comprising a prime mover in the form of an ICE 12, a CVT 14, a hydraulic slip arrangement 16, optional supplemental driveline component(s) 18 and a controller 42. The output of the optional supplemental driveline component(s) 18 is connected to a load 20, for example wheels of an off-road vehicle.

As will easily be understood by one skilled in the art, the supplemental driveline component(s) 18 may include multi-speed gearboxes and/or reverse/forward mechanisms and/or range selection, amongst others. These optional components are controlled by the controller 42 and may supply data thereto.

A first shaft 22 interconnects the output of the ICE 12 and the input of the CVT 14; the speed of the first shaft is measured via a first speed sensor 24. A second shaft 26 interconnects the output of the CVT 14 and the input of the arrangement 16; the speed of the second shaft 26 is measured via a second speed sensor 28. A third shaft 30 interconnects the output of the arrangement 16 and the input of the optional supplemental driveline component(s) 18; the speed of the third shaft 30 is measured via a third speed sensor 32. Finally, a fourth shaft 34 interconnects the output of the optional supplemental driveline component(s) 18 and the load 20.

Of course, one skilled in the art will understand that should the supplemental driveline component(s) 18 be absent, the shaft 34 would not be present and the shaft 30 would interconnect the output of the arrangements 16 and the load 20.

Conventionally, the ICE 12 is associated with a user throttle control 36 that also supplies data to the controller 42, for example an acceleration pedal or lever. Of course, the ICE could be controlled directly by the controller 42 and supply operating data thereto, as shown by optional bidirectional link 43.

The driveline 10 includes a ratio controller 38 so configured as to set the ratio of the CVT 14 according to either a ratio provided by the user via a user ratio control 40 or according to a ratio provided by the main controller 42 as will be described hereinbelow. It will be understood from the foregoing description that the ratio supplied by the main controller 42 has precedence over the user ratio control 40. Accordingly, the main controller 42 may take over and dictate the ratio of the CVT.

The hydraulic slip arrangement 16 includes a planetary gear train 50 provided with a sun gear 52 defining the input thereof and connected to the shaft 26, planet gears 54 interconnected to the carrier 56 which is connected to the power input 57 of a hydraulic pump 58, and a ring gear 60 defining the output of the arrangement 16 and connected to the shaft 30. In other words, the planetary gear train includes an input in the form of the sun gear 52 and first and second outputs in the respective forms of the ring gear 60 and the planet carrier 56.

The hydraulic pump has an inlet (not shown) connected to a reservoir of hydraulic fluid (also not shown) and an outlet 62 connected to an adjustable release valve 64. The pressure at which the adjustable release valve 64 opens may be adjusted by a release valve controller 66, which is controlled by the main controller 42. The release valve controller 66 may be viewed as a slip controller.

The hydraulic slip arrangement 16 generally operates as follows. The release valve controller 66 is so configured as to take a torque value from the controller 42 and to control the release valve 64 so that the hydraulic pump 58 provides a similar breaking torque onto the carrier 56 to thereby allowing the usable torque to pass through the planetary gear train 50. Accordingly, when the breaking torque is surpassed, the release valve 64 at least partially opens, thereby allowing the hydraulic pump 58 to rotate and to divert the supplemental torque that passes through the planetary gear train 50. A torque corresponding to the torque value supplied by the controller 42 will still pass through the gear train 50 and reach the load 20 even though a slip occurs between the shafts 26 and 30.

One skilled in the art will have no problem building such a release valve controller adapted to the technology used in the arrangement 16.

The speed data from the first and second speed sensors 24 and 28 is supplied to the main controller 42 so that the controller 42 may determine the actual ratio of the CVT in real time. Furthermore, the speed data of the second and third speed sensors 28 and 32 is supplied to a slip detector 46 that may determine if slippage of the arrangement 16 occurs, in real time, and supply this slip level data to the main controller 42.

As shown in the appended drawings, the supplemental driveline component(s) 18 and its connection to the main controller 42 are optional and shown schematically. As mentioned hereinabove, the supplemental driveline component(s) 18 is there to represent, for example, a conventional multi speed arrangement that allows different gear ratios to be interposed between the arrangement 16 and the load. Since the configurations and the operation of such supplemental driveline component(s) are believed known to those skilled in the art, they will not be further described herein.

Figure 2:
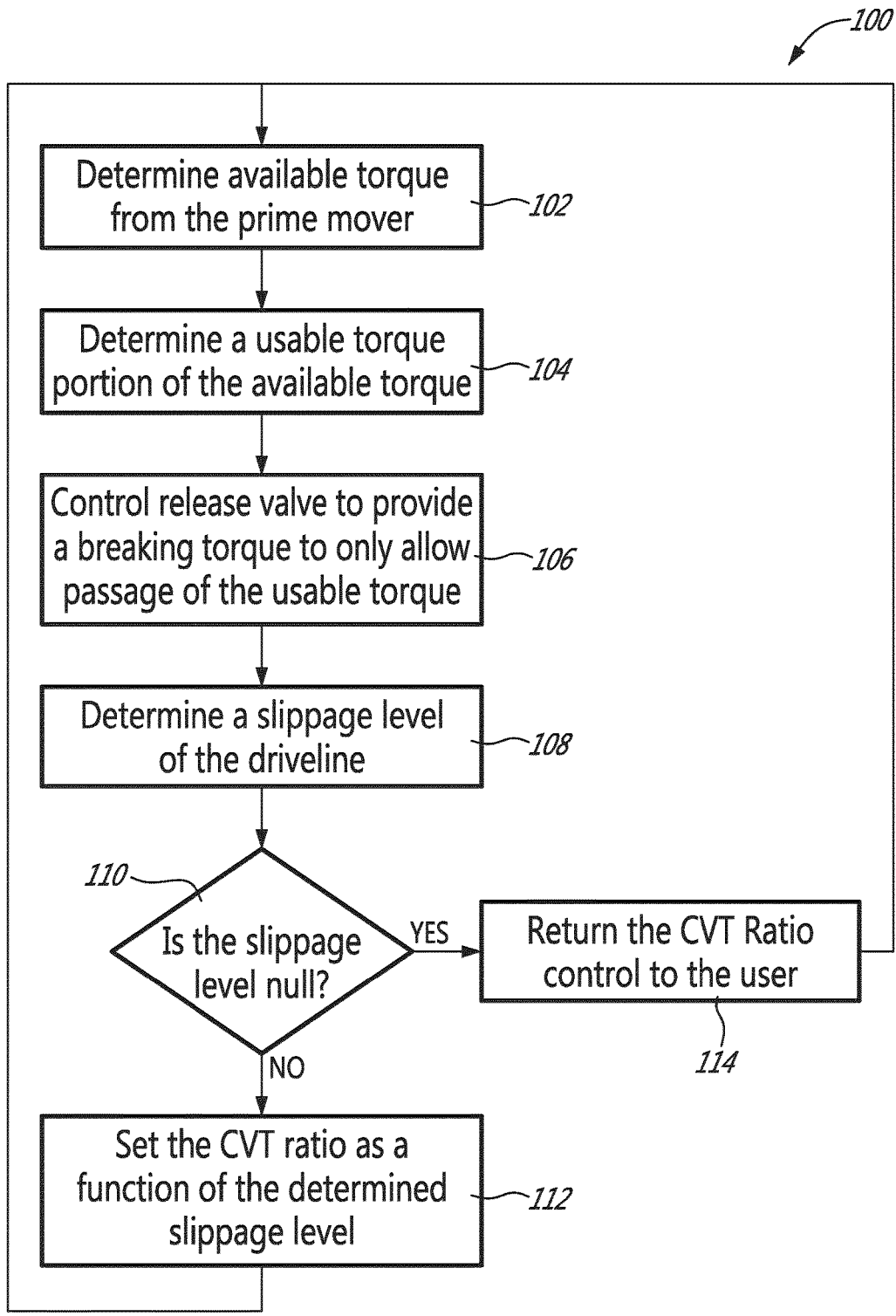
FIG. 2 is a block diagram of a method to control the slip of a hydraulic slip arrangement.

Turning now to FIG. 2 of the appended drawings, a slip control method 100 for a driveline including a continuously variable transmission will be described.

The first step 102 of the method 100 consists of determining the available torque from the prime mover. With reference to FIG. 1, the prime mover, in the form of the ICE 12, has a map of available torque depending on the RPM of its output shaft. This table is either built in the ICE and can be supplied to the controller 42, known and stored in the controller 42 or has been built by the driveline manufacturer and stored in the controller 42. Since the controller 42 has the speed data from the first speed sensor 24, it can look up the available torque in real time.

Of course, the available torque could be directly supplied by the prime mover to the controller 42, should the prime mover used have this feature.

Figure 3:
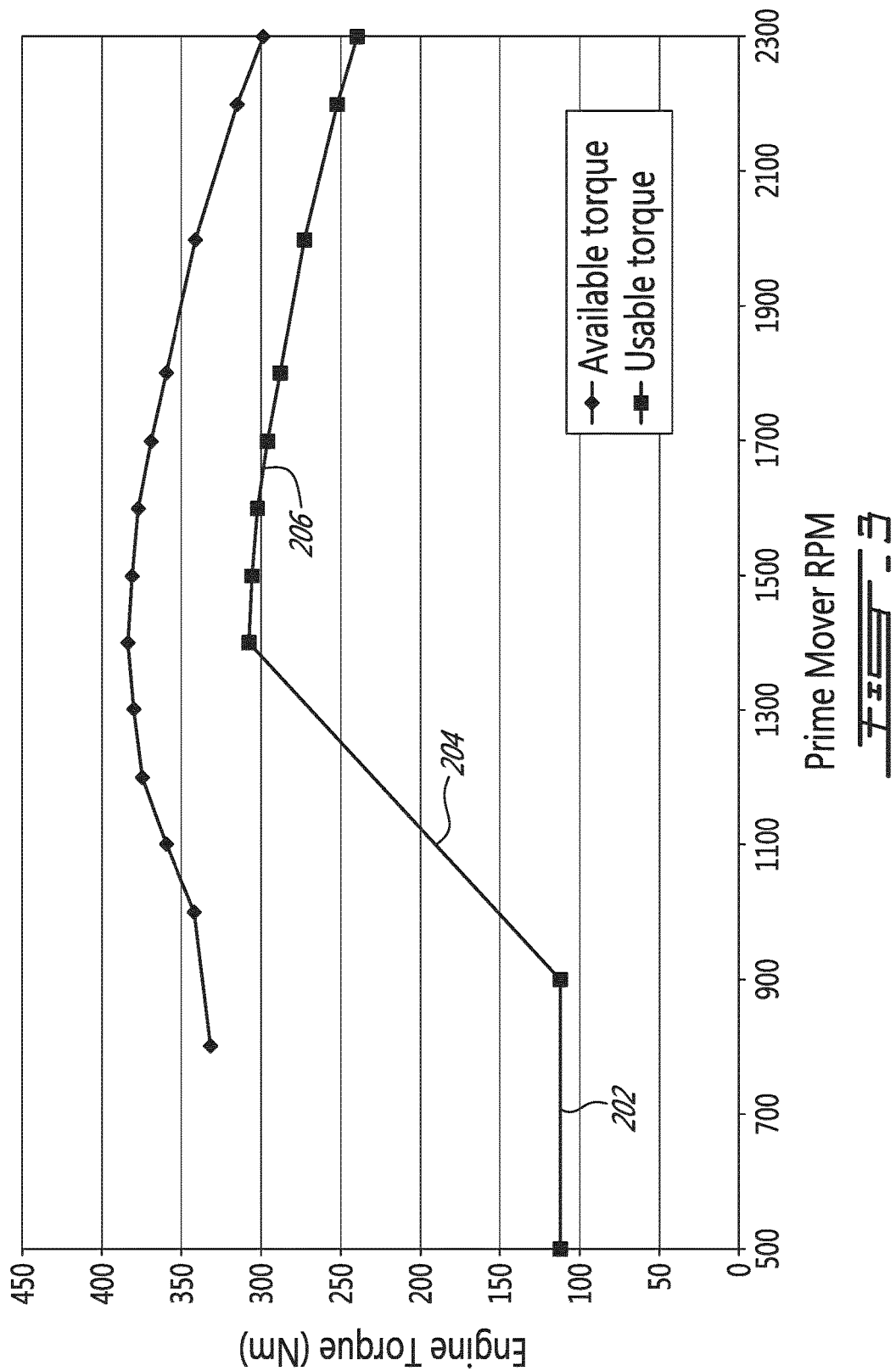
FIG. 3 is a graph illustrating the torque vs. RPM of a prime mover and the torque allowed to pass through a hydraulic slip arrangement vs. RPM.

FIG. 3 of the appended drawings illustrates the available torque vs. RPM for a particular ICE.

From the instantaneous available torque, the controller 42 determines a usable torque in step 104. The usable torque is lower than the available torque and provides a safety margin to prevent the ICE 12 from stalling.

Again, FIG. 3 illustrates the usable torque vs. RPM for a particular ICE. It is to be noted that the usable torque does not follow the available torque at low RPMs. The reason therefor will be explained hereinbelow.

It is to be noted that the usable torque illustrated in FIG. 3 is the usable torque at the output of the ICE 12. The use of a CVT 14 downstream of the ICE allows this usable torque to be modified by the CVT 14. Indeed, the torque is multiplied as a function of the ratio of the CVT. The controller therefore uses its knowledge of the instantaneous CVT ratio to determine a usable torque at the input of the hydraulic slip arrangement 16 and this value is used in the next steps. In other words, the usable torque graph of FIG. 3 is offset as a function of the CVT ratio by the controller 42.

The controller 42, in step 106, controls the release valve 64, via the release valve controller 66, so that a breaking torque is applied to the carrier 56 by the hydraulic pump 58 to prevent rotation thereof. The amount of breaking torque is determined by the controller 42 as a function of the usable torque. Accordingly, should the requested torque be greater than the usable torque, the release valve 64 at least partially opens and rotation of the carrier 56 occurs, which causes slippage of the hydraulic slip arrangement 16.

Accordingly, should a block load be applied, for example by preventing wheels of the off-road vehicle from rotating, the torque requested by the wheels, and therefore attempting to pass through the arrangement 16, increases drastically and quickly exceeds the usable torque. When this occurs, the release valve 64 at least partially opens since the requested torque is greater that the breaking torque supplied to the carrier 56 by the hydraulic pump/release valve combination. This opening of the release valve allows rotation of the carrier 56, preventing the ICE 12 from stalling and protecting the various components of the driveline, including the CVT 14. Indeed, as is well known to those skilled in the art, should the output shaft of the ICE be prevented from rotating while the ICE is operating, the ICE would stall. Slippage of the arrangement 16 above a predetermined adjustable torque level therefore ensures that the output shaft of the ICE is not prevented from rotating.

The method 100 could stop there. It would therefore loop back to step 102 and repeat the above-described steps.

However, since the driveline 10 includes a CVT that can inherently modify the speed ratio and therefore the available torque at the input of the hydraulic slip arrangement 16, supplemental steps have optionally been added to the method 100 to improve the usability of the driveline 10.

Step 108 involves the determination of the slippage level of the hydraulic slip arrangement 16. This is done by the slip detector 46 and the slippage level data is supplied to the main controller 42.

The controller 42, in step 110, branches to step 112 if the slippage is non-null. In other words, if there is slippage, step 112 is performed.

In step 112, the controller 42 takes over the ratio control 38 and dictates the ratio of the CVT 14. The controller 42 is so configured that the ratio of the CVT is decreased in proportion of the slippage of the arrangement 16. Indeed, since the usable torque increases as the CVT ratio decreases, the slippage setpoint of the arrangement 16 is automatically modified by the controller 42 and slippage may stabilize, decrease and/or stop.

One possible way of controlling the driveline 10 is to control the slippage so as to stabilize it. This is done by gradually changing the CVT ratio until the arrangement slippage remains substantially constant.

Step 112 loops back to step 102.

Should no slippage be detected in step 110, the step 114 is performed. In this step, the control of the CVT ratio is gradually returned back to the user since the usable torque is sufficient to drive the load 20. This is done gradually so as to prevent sudden change in driving behavior, which is detrimental to the user driving sensations. The performance of the driveline may be controlled by the user in those circumstances. This step returns to step 102 to loop the method 100.

Returning to FIG. 3, the usable torque graph may be separated in three zones. A low RPM zone 202, a medium RPM zone 204 and a high RPM zone 206.

In the low RPM zone 202, the usable torque is set significantly lower than the available torque. Accordingly, the slippage of the arrangement 16 will be more pronounced at these speeds. In this zone, the usable torque is set low enough as to either prevent rotation of the output or allow "creeping" of the output given a small load depending on the desired driving sensation.

In the medium RPM zone 204, the usable torque linearly increases with the RPM but is still significantly lower than the available torque from the prime mover. The arrangement slippage will therefore decrease with increasing RPM, which has been found to give better driving sensations to the operator. Of course, the linearity of the medium RPM zone is not required and other functions could be used.

Finally, in the high RPM zone 206, the usable torque follows the available torque with a safety margin.

As an example of application of the driveline 10, the operation of a loader tractor will be briefly described. Such a tractor often has to push against obstacles, for example when its bucket is being filled. When this is the case, the ICE must be prevented from stalling. By providing a driveline as proposed herein, the ICE stalling would be prevented by the selective opening of the release valve, which would cause the slippage of the arrangement 16, and the torque supplied to the wheels would be increased by the control of the CVT ratio. All that without special intervention of the operator other than actuating the throttle control according to the desired speed of the vehicle.

As will be easily understood by one skilled in the art, the main controller 42 could integrate the ratio controller 38, the release valve controller 66, the slip detector 46 and/or supplemental driveline component(s) 18.

As will be understood by one skilled in the art, even though separate speed sensor 24 has been illustrated and described herein, this sensor could be integrated with the ICE 12. In other words, the means for determining the speed of the output shaft could be separated or integrated with the prime mover.

It is to be understood that the slip control method and arrangement for a driveline including a continuously variable transmission is not limited in its application to the details of construction and parts illustrated in the accompanying drawings and described hereinabove. The slip control method and arrangement for a driveline including a continuously variable transmission is capable of other embodiments and of being practiced in various ways. It is also to be understood that the phraseology or terminology used herein is for the purpose of description and not limitation. Hence, although the slip control method and arrangement for a driveline including a continuously variable transmission has been described hereinabove by way of illustrative embodiments thereof, it can be modified, without departing from the spirit, scope and nature thereof.

What is claimed is:

1. A method to control the slippage of a driveline including a prime mover having an output, a continuously variable transmission (CVT) having an input connected to the output of the prime mover and an output, a controllable slippage level hydraulic slip arrangement having an input connected to the output of the CVT and an output, the hydraulic slip arrangement including a planetary gear assembly provided with one input and first and second outputs; the input defining the input of the hydraulic slip arrangement; the first output defining the output of the hydraulic slip arrangement; the second output being connected to a hydraulic pump provided with a controllable release valve, the method including the steps of:

determining a usable torque of the prime mover; and controlling the slippage level of the hydraulic slip arrangement to allow the usable torque to pass through the hydraulic slip arrangement but to slip should a requested torque be greater than the usable torque by controlling the release valve to allow the hydraulic pump to rotate should the requested torque be greater than the usable torque.

2. The slippage control method of claim 1 further comprising:

detecting a slippage level of the hydraulic slip arrangement; and setting a CVT ratio as a function of the slippage level of the hydraulic slip arrangement so as to increase the usable torque.

3. The slippage control method of claim 1, wherein the usable torque determining includes obtaining the available torque of the prime mover and determining a usable torque as a function of the available torque.

4. A driveline including:

a prime mover having an output shaft;

means for determining the speed of the output shaft;

a CVT having an input connected with the output shaft of the prime mover and an output;

a controllable hydraulic slip arrangement having an input connected with the output of the CVT and an output; the controllable hydraulic slip arrangement includes a planetary gear assembly provided with one input and first and second outputs; the input defining the input of the hydraulic slip arrangement the first output defining the output of the hydraulic slip arrangement the second output being connected to a hydraulic pump provided with an adjustable release valve;

a slip controller controlling the level of torque allowed to pass through the hydraulic slip arrangement before slippage occurs therein; and a main controller connected with the output shaft speed determining means and the slip controller; the main controller being so configured as to determine a usable portion of the available torque of the prime mover and to set the slip controller so that the adjustable release valve allows the hydraulic pump to rotate to thereby cause the hydraulic slip arrangement to slip when torques greater than the usable torque attempt to pass through the hydraulic slip arrangement.

5. The driveline of claim 4, further comprising means to determine the slippage level of the controllable hydraulic slip arrangement.

6. The driveline of claim 5, wherein the slippage level determining means include an input speed sensor determining the speed of the input of the controllable hydraulic slip arrangement; an output speed sensor determining the speed of the output of the controllable hydraulic slip arrangement.

7. The driveline of claim 6, wherein the input and output speed sensors supply speed data to a slip detector that compares speed data from both sensors to determine the slippage level.

8. The driveline of claim 7, wherein the slip detector supplies slippage level data to the main controller.

9. The driveline of claim 7, wherein the slip detector is integrated with the main controller.

10. The driveline of claim 5, further comprising a ratio controller setting the output/input ratio of the CVT; the ratio controller being connected to the main controller so as to be controlled thereby; the main controller being so configured as to modify the CVT ratio when slippage of the hydraulic slip arrangement is detected.

11. The driveline as recited in claim 10, wherein the ratio controller is so configured as to decrease the CVT ratio when slippage is detected.

12. The driveline as recited in claim 10, wherein the ratio controller is integrated with the main controller.

13. The driveline as recited in claim 4, wherein the slip controller is so configured as to control the adjustable release valve so that the hydraulic pump applies a braking torque substantially equal to the usable torque to the second output.

14. The driveline as recited in claim 4, wherein the input of the planetary gear assembly is defined by a sun gear, the first output is defined by the ring gear and the second output is defined by the planet carrier.

15. The driveline as recited in claim 4, wherein the means for determining the speed of the output shaft of the prime mover includes a speed sensor supplying speed data to the main controller.

16. The driveline as recited in claim 4, wherein the slip controller is integrated with the main controller.

* * * * *